May 17, 1966 P. K. WEIMER 3,252,009

PULSE SEQUENCE GENERATOR

Filed Oct. 22, 1963 2 Sheets-Sheet 1

INVENTOR.
PAUL K. WEIMER
BY John V. Regan
Attorney

INVENTOR.
PAUL K. WEIMER
BY John V. Regan
Attorney

United States Patent Office 3,252,009

Patented May 17, 1966

3,252,009

PULSE SEQUENCE GENERATOR

Paul K. Weimer, Princeton, N.J., assignor to Radio Corporation of America, a corporation of Delaware Filed Oct. 22, 1963, Ser. No. 317,964
10 Claims. (Cl. 307—88.5)

This invention relates to pulse generators and, in particular, to a pulse sequence generator for generating output pulses progressively on different output lines.

In the electrical transmission of images for remote viewing, electronic camera tubes have been developed that have an image receiving area or screen on which a picture is projected. The screen is scanned by means of an electron beam to produce time-varying video signals corresponding to a special analysis of the projected image. It has been suggested that some of the limitations of camera tubes and beam scanning might be overcome by replacing the tube with a solid state image sensing panel comprising a large number of individual photosensitive elements. These elements could be individually addressed by means of a crossed-grid array of horizontal and vertical coordinate conducting strips which are individually scannable. A similar panel comprising an array of light emitting elements addressed in a similar fashion may be used as an image display panel.

To achieve resolution comparable to commercial television, the number of horizontal and vertical conducting strips might be in excess of 500 in each coordinate direction. Scanning of these strips may be accomplished by a pair of pulse sequence generators, each of which applies voltage pulses progressively to the various strips along a different coordinate direction. Alternatively, one generator may be used to scan in one direction, and other techniques may be used for scanning in the other direction. In the realization of such a system in a practical manner, considering size, cost and other factors, it is desirable that the pulse sequence generator be one capable of being fabricated in the form of an integrated structure at the periphery of the panel. The generator circuitry, therefore, should be as simple, and should have as few components, as possible. Also, the progressive pulse output of the scanner should remain constant in amplitude without a tendency to spread or otherwise change shape.

It is to be understood, however, that the pulse generator system described herein has many other applications besides that of an image scanner. For example, the generator is useful in applications such as shifting type circuits, ring counters, unidistance counters, and so on. Also, the output pulses may be narrowed, if desired.

It is one object of this invention to provide an improved pulse sequence generator.

It is another object of this invention to provide a pulse scanner which lends itself readily to fabrication using integrated circuit techniques.

It is still another object of this invention to provide an improved pulse sequence generator which has a minimum of circuitry interconnecting the various stages of the generator.

It is a further object of this invention to provide an improved pulse sequence generator which may employ direct coupled amplifying devices.

An improved pulse sequence generator according to the invention includes a chain of cascaded stages each having first and second amplifying devices, preferably insulated-gate field-effect transistors. The output electrode of each first amplifying device is directly connected to the control electrode of the second amplifying device in the same stage, and the output electrode of each second amplifying device is directly connected to the control electrode of the first amplifying device in the next succeeding stage. In one arrangement, a different capacitor is connected between each different one of the latter direct connections and a point of reference potential. All of the amplifying devices in the odd numbered stages are energized intermittently, during selected time periods, and the amplifying devices of the even numbered stages are energized during other, different time periods. Generation of a sequence of pulses is commenced by applying an input pulse to one of the amplifying devices.

In the accompanying drawing, like reference characters denote like components, and:

Although the pulse sequence generator of the invention has particular application as an integrated scan generator for an image sensing or image display panel, as previously mentioned, the pulse sequence generator may have other uses also, either in integrated or non-integrated form.

Figure 1:
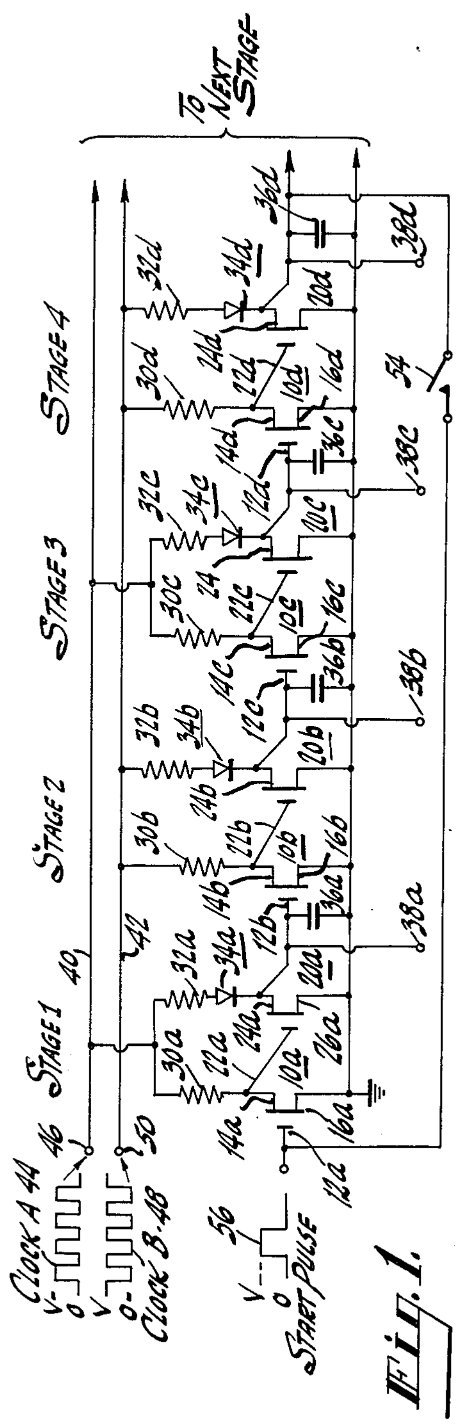
FIGURE 1 is a schematic diagram of one form of pulse sequence generator according to the invention.

The pulse sequence generator may have any number of stages, depending upon the number of output lines which it is desired to energize. In the arrangement of FIGURE 1, four stages are illustrated by way of example, the particular number being illustrative only. The various stages are substantially similar and, for this reason, only the first stage will be described in detail. Since the stages are similar, the like components are designated by like reference numerals, followed by an alphabetic character *a*, *b*, *c* or *d* depending upon whether the component appears in stage 1, 2, 3 or 4, respectively.

The first stage includes a first amplifying device 10*a* having a control electrode 12*a*, an output electrode 14*a* and a common electrode 16*a*. Output electrode 14*a* is connected directly, that is to say, by negligible impedance means, to the control electrode 22*a* of a second amplifying device 20*a* in the same stage. Common electrodes 16*a* and 26*a* are connected to a point of reference potential, indicated by the conventional symbol for circuit ground. A resistor 30*a* is connected between the output electrode 14*a* of the first amplifying device 10*a* and a first bus 40. The series combination of a resistor 32*a* and a unidirectional conducting device 34*a*, which may be a diode for example, is connected between the first bus 40 and the output electrode 24*a* of the second amplifying device 20*a*. Unidirectional conducting device 34*a* is poled to present a low impedance path to the output current of a second amplifying device 20*a*.

The output electrode 24*a* of second amplifying device 20*a* is connected directly to the control electrode 12*b* of the first amplifying device 10*b* in the next succeeding stage (stage 2), to a first output terminal 38*a*, and by way of a capacitor 36*a* to circuit ground. Capacitor 36*a* essentially is connected between the control 12*b* and common 16*b* electrode of the amplifying device 10*b*. Preferably the capacitor 36*a* is a linear capacitor.

The remaining stages are structurally similar to the first stage, as described, except that the resistors in the output circuits of the first and second amplifying devices in even numbered stages are connected to a second bus 42, rather than to the first bus 40. That is to say, resistors 30*b*, 32*b*, 30*d* and 32*d* in stages 2 and 4 are connected at their upper ends to a second bus 42, while the resistors 30*a*, 32*a*, 30*c* and 32*c* in stages 1 and 3 are connected to the first bus 40. The pulse sequence generator may be operated as a closed loop device, simulating ring counter type operation, by closing a switch 54 in a feedback path between the output electrode 24*d* in the last stage and the control electrode 12*a* in the first stage.

Energizing signals 44, illustrated as periodically occurring square wave pulses, are applied between circuit ground and a terminal 46 on first bus 40. Energizing signals 48 of a different phase are applied between circuit ground and a terminal 50 on second bus 42. The two sets of energizing signals 44, 48 which need not necessarily be square wave pulses, preferably are of opposite phase. That is to say, when a pulse 44 goes from zero volts to +V volts, the other pulse 48 goes from +V volts to zero volts concurrently, and vice-versa.

An insulated-gate field-effect transistor has characteristics which make such a device particularly suitable for use as the amplifying devices in the FIGURE 1 arrangement. An insulated-gate field-effect transistor may be defined generally as a majority carrier field effect device which includes a semiconductor layer or wafer to which source and drain electrodes are affixed. A gate electrode is separated by an insulated film from a portion of the semiconductor which lies between the source and drain electrodes. Since the gate is insulated from the semiconductor, it does not draw any current, or at least it draws no appreciable current, whereby the drain electrode of one device may be connected directly to the gate electrode of another device.

Two types of suitable insulated-gate field-effect transistors are the thin-film transistor (TFT) and the metal-oxide-semiconductor (MOS). The physical and operating characteristics of a thin-film transistor are described in an article, by the inventor, entitled, "The TFT—A New Thin-Film Transistor," appearing at pages 1462–1469 of the June 1962 issue of the Proceedings of the IRE. The MOS transistor and its characteristics are described in an article entitled, "The Silicon Insulated-Gate Field-Effect Transistor," by S. R. Hofstein and F. P. Heiman, appearing at pages 1190–1202 of the September 1963, issue of the Proceedings of the IEEE. Reference may be had to the aforementioned articles for details of the devices.

Suffice it to say here that an insulated-gate field-effect transistor may be of either the enhancement type or the depletion type, depending upon the preparation of the semiconductor, its conductivity, and the shape of the energy band at the interface between the semiconductor and the insulated gate. The enhancement type unit is of particular interest in the present application. When a device is operated in the enhancement mode, only a small leakage current flows between the source and drain electrodes when the voltages at the gate and source electrodes have the same value. Current flows between source and drain when the voltage at the gate electrode is increased in a first polarity direction relative to the voltage at the source.

The device operates as an amplifier, and the amount of current flowing between source and drain is a function of the bias voltage applied between the gate and source electrodes. Essentially, the conductivity of the semiconductor material in the conducting channel between source and drain is controlled by the voltage between the gate and source electrodes. When the semiconductor is N-type conductivity material, current flows between source and drain when the gate voltage is positive relative to the source voltage. For a P-type unit the gate is biased negative relative to the source of voltage for conduction. For the voltage polarities indicated in FIGURE 1, N type transistors are contemplated. However, P-type transistors could also be used, provided that the polarities of the various energizing and signal pulses are reversed, and provided further that the easy current flow directions of unidirectional conducting devices 34*a* . . . 34*d* are reversed. The gate, drain and source electrodes correspond to the control, output and common electrodes, respectively.

Figure 2:
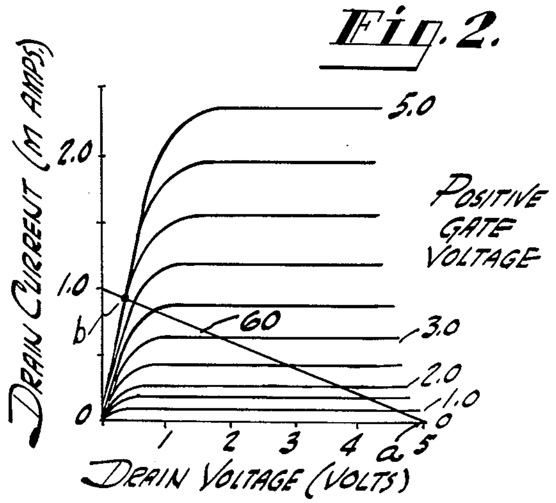
FIGURE 2 is a set of operating characteristics of one type of insulated-gate field-effect transistor that may be used in practicing the invention.

The operation of the pulse sequence generator may best be understood by first considering some of the operating characteristics of the transistors. FIGURE 2 is a set of characteristic curves for an N-type thin-film transistor operating in the enhancement mode. Drain current is plotted, along the ordinate, against drain voltage, plotted along the abscissa, for different values of positive gate bias. The source electrode is assumed to be at zero voltage. The particular values of current and voltage for a device are dependent upon the manufacturing process and other factors and may be varied over wide limits. Accordingly, the particular values given in FIGURE 2 should be viewed as illustrative only.

For purposes of illustration, it is assumed that the energizing pulses 44 and 48 (FIGURE 1) vary between zero and +5 volts, and that the drain resistors 30*a* . . . 30*d* and 32*a* . . . 32*d* each have a value of 5K ohms. Accordingly, a load line 60 may be drawn on the FIGURE 2 characteristics which intersects the abscissa at a point *a*, corresponding to +5 volts, and which intersects the ordinate at a point corresponding to +1 milliampere. As will be seen from a later description of the FIGURE 1 circuit, the gate voltage may have a value of either zero volts or of approximately +V volts, assumed to be +5 volts in this example. This means that the static operating points in FIGURE 2 are given by the intersections *a* and *b* of load line 60 with the curves representing gate voltages of zero volts and +5 volts, respectively.

The zero voltage gate characteristic is coincident, or nearly so, with the abscissa. Accordingly, little or no drain current flows where the drain voltage is +5 volts and the gate voltage is zero. When the gate voltage rises to +5 volts, the operating point moves up on the load line 60 to the point *b* of intersection with the +5 volt gate characteristic. The voltage appearing between drain and source then is somewhat less than one-half volt and, for convenience, will be considered to be zero in the following discussion. It should be understood that static operating conditions only are represented in FIGURE 2, and that the dynamic conditions are somewhat different. It should also be pointed out that the drain current is substantially zero when the applied drain voltage is zero, regardless of the gate voltage.

Figure 3:
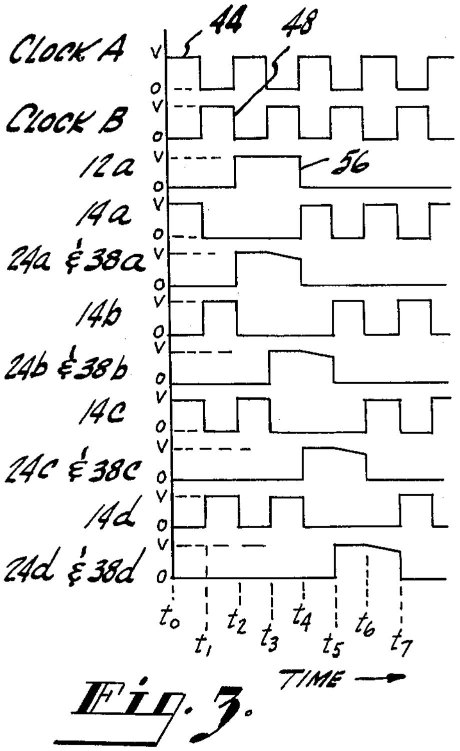
FIGURE 3 is a set of waveforms of voltages appearing at different points in the FIGURE 1 circuit.

Consider now the operation of the pulse sequence generator of FIGURE 1 and refer to the timing diagram of FIGURE 3. In FIGURE 3, the lines of waveforms are numbered to correspond to points in FIGURE 1 at which the waveforms appear.

Assume that the voltage at the gate electrode 12*a* of first transistor 10*a* in stage 1 has remained at zero volts for a considerable period of time, whereby transistor 10*a* has remainded nonconducting. At time $t_0$, the clock B voltage applied to second bus 42 falls to zero volts. This causes the voltage at the drain electrodes 14*b*, 24*b*, 14*d* and 24*d* of the even numbered stages to fall to zero volts. The zero voltage at drain electrode 24*b* appears also at the gate electrode 12*c* of the first transistor 10*c* in the third stage, and biases this transistor 10*c* nonconducting. Since both of the first transistors 10*a* and 10*c* in the odd numbered stages are nonconducting, the +V clock voltage applied to first bus 40 at $t_0$ appears at the drain electrodes 14*a*, 14*c* of these transistors and is coupled across to the gate electrodes 22*a*, 22*c* of the second transistors 20*a*, 20*c*, respectively, biasing the latter transistors full on. The resulting zero (approximately) drain voltages of these transistors 20*a*, 20*c* prevents capacitors 36*a* and 36*c* from charging.

Since capacitors 36*a* and 36*c* are uncharged, first transistors 10*b* and 10*d* in the even numbered stages remain nonconducting when the clock B voltage rises to +V at time $t_1$. The +V volts applied at the drain electrodes of these transistors 10*b*, 10*d* appears also at the gate electrodes 22*b* and 22*d* of the second transistors 20*b* and 20*d*, biasing these latter transistors in the "on" condition. Accordingly, the voltages at drain electrodes 24*b* and 24*d* remain close to zero and prevent capacitors 36*b* and 36*d* from charging. Capacitors 36*a* and 36*c* remain uncharged because the voltage on first bus 40 is zero at this time.

At time $t_2$ the voltage on second bus 42 falls to zero volts and all the transistors in the even numbered stages become nonconducting. The voltage on first bus 40 rises to +V volts. A positive "start" pulse 56 is applied at the gate electrode 12*a* of first transistor 10*a* at this time and turns on this transistor 10*a*. The voltage at its drain electrode 14*a* then is close to zero and second transistor 20*a* of the first stage is biased off. However, a voltage of +V volts is applied to the drain electrode 24*a* of second transistor 20*a* from first bus 40. This voltage causes the capacitor 36*a* to charge to +V volts through unidirectional conducting device 34*a* and resistor 32*a*. Simultaneously, a positive voltage appears at the output terminal 38*a*.

At time $t_3$, the clock A voltage falls to zero and the clock B voltage rises to +V. Capacitor 36*b* cannot discharge because the unidirectional conducting device 34*a* becomes reverse-biased. Actually, the capacitor may discharge a small amount, as indicated in FIGURE 3, due to stray leakage paths. The positive charge on capacitor 36*a* biases the first transistor 10*b* of stage 2 into conduction at $t_3$, whereby the second transistor 20*b* of the second stage is nonconducting. The +V volts applied at the drain electrode 24*b* of the latter transistor 20*b* charges the capacitor 36*b* to +V volts through the resistor 32*b* and unidirectional conducting device 34*b*. A positive output voltage appears at output terminal 38*b*. It is important to note that conducting transistor 10*b* does not discharge capacitor 36*a*. This is because of the high resistance of the insulated gate 12*b*.

At $t_4$, the clock A voltage rises to +V and clock B voltage falls to zero. If the "start" pulse 56 terminates at or prior to $t_4$, first transistor 10*a* in the first stage is nonconducting and the +V volts at its drain electrode 14*a* biases second transistor 20*a* full "on." Capacitor 36*a*, then discharges rapidly through the very low drain 24*a*—source 26*a* path of the second transistor, and the output voltage at output terminal 38*a* falls rapidly toward ground potential. The positive charge on capacitor 36*b*, however, biases "on" the first transistor 10*c* of the third stage. The resulting low drain 14*c* voltage maintains the second transistor 20*c* of the third stage in the nonconducting condition, and capacitor 36*c* charges to +V volts through resistor 32*c* and unidirectional device 34*c*. A positive output then appears at output terminal 38*c*.

By analysis similar to the foregoing, it can be shown that capacitor 36*d* charges at $t_5$ to produce a positive voltage at output terminal 38*d*. Also, capacitor 36*b* is discharged through transistor 20*b* at $t_5$ to terminate the positive output at terminal 38*b*. The generation of output pulses may be made to continue indefinitely, if desired, by closing switch 54 in the feedback loop.

The successive output pulses do not deteriorate in amplitude because the capacitors 36*a* . . . 36*d* all charge, in turn, to the same voltage. Assuming equal impedance leakage paths for each capacitor, the leakage discharge of each capacitor is equal. The widths of the successive pulses are the same because of the clock pulses and the action of the various transistors. Turn-on and turn-off times of the transistors have been found to have negligible effect on the pulse width if the stages have a high enough gain.

For proper operation of the FIGURE 1 pulse scan generator, the following conditions should be satisfied. (1) The gain of each transistor stage should be greater than unity so that complete transistor switching occurs. (2) The gain-bandwidth product of a transistor stage should exceed $1/T$, where $T=t_1-t_0$, $t_2-t_1$, etc. (3) The charge and discharge time of the capacitors 36*a* . . . 36*d* should be much less than T, say ½T or less. (4) Each capacitor should have a capacitance which is greater than $I_L T/\Delta v$, where $I_L$ is the transistor drain current at cut-off condition and $\Delta v$ is the maximum permitted change in the voltage across a capacitor due to leakage. (5) The reverse current through the back biased unidirectional conducting device should be less than the leakage current of a cutoff transistor. (6) The capacitance across a unidirectional conducting device should be much less than the capacitance of the associated capacitor 36*a* . . . 36*d*, say 1/10 or less. (7) The loads connected at output terminals 38*a* . . . 38*d* should be sufficiently high in impedance so as not to discharge the capacitors 36*a* . . . 36*d*, respectively. The aforementioned conditions are readily met with evaporated thin-film transistors.

In addition to the type of operation described above, pulses of greater width may be generated at the same frequency by appling the "start" pulse 56 at gate electrode 12*a* for a longer period of time. Doubling the width of the start pulse 56, for example, doubles the widths of the output pulses. The pulse sequence generator also is capable of generating predetermined patterns of pulses by a suitable programming of start pulses to selected ones, or to one only, of the gate electrodes. The generator also is capable of being used as a shift register where long term storage is not required. For example, the generator could be used for serial-parallel or parallel-serial conversion.

Figure 4:
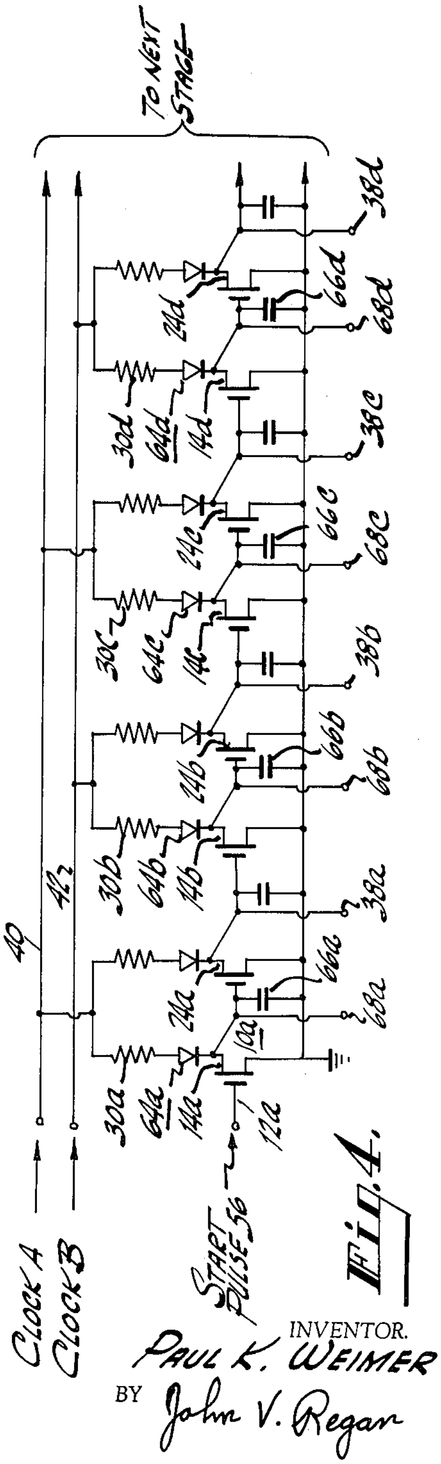
FIGURE 4 is a schematic diagram of a modified form of the FIGURE 1 arrangement.

A modified form of the FIGURE 1 pulse sequence generator is illustrated schematically in FIGURE 4. The modifications are of three general types, as follows: (1) diodes 64*a* . . . 64*d* are connected, respectively, between the drain electrodes 14*a* . . . 14*d* and resistors 30*a* . . . 30*d*; (2) capacitors 66*a* . . . 66*d* are connected between the drain electrodes 14*a* . . . 14*d*, respectively, and circuit ground; and (3) output terminals 68*a* . . . 68*d* are connected to the drain electrodes 14*a* . . . 14*d*, respectively.

Figure 5:
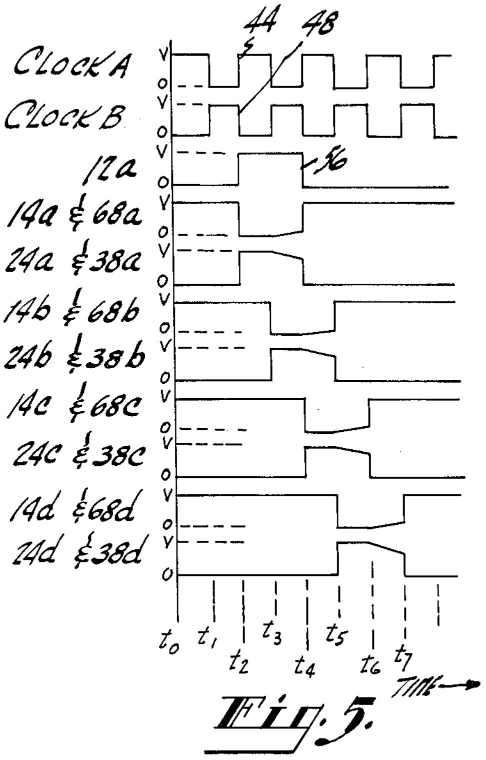
FIGURE 5 is a set of waveforms of voltages appearing at selected points in the FIGURE 4 arrangement.

A set of voltage waveforms for the FIGURE 4 arrangement is given in FIGURE 5, wherein the various lines are numbered to correspond with the points in FIGURE 4 at which the waveforms appear. It may be noted by comparing FIGURES 3 and 5 that the voltages appearing at drain electrodes 24*a* . . . 24*d* and output terminals 38*a* . . . 38*d* are the same for both the FIGURE 1 and FIGURE 4 arrangements. Only the waveforms at drain electrodes 14*a* . . . 14*d* are different. This difference arises from the fact that capacitors 66*a* . . . 66*d* normally are charged to +V volts when output pulses are not being generated For example, first transistor 10*a* in the first stage is normally nonconducting. When clock A voltage goes from zero to +V volts, capacitor 66*a* charges to +V volts and remains charged until first transistor 10*a* is rendered conductive by a "start" pulse 56. Although capacitor 66*a* may discharge slightly, because of leakage, between clock periods, it always becomes fully charged again the next time clock A voltage rises to +V volts.

An interesting feature of the FIGURE 4 arrangement is that the two output voltages of the same stage are complementary. That is to say, when the voltage at output terminal 68*a*, for example, is zero volts, the voltage at output terminal 38*a* is +V volts, and vice-versa. This feature renders the FIGURE 4 arrangement particularly useful in a shift register type application where complementary outputs from a stage are either desired or required, as is often the case. In addition, the utility of the arrangement as a pulse sequence generator is enhanced because both possitive and negative outputs are available.

What is claimed is:

1. The combination comprising:

a chain of cascaded stages, each stage including a first amplifying device and a second amplifying device, each said amplifying device having a first electrode and an output electrode defining a current carrying path, and having a control electrode, means intercoupling the output electrode of each first amplifying device and the control electrode of the second amplifying device in the same stage,
direct current conducting means intercoupling the output electrode of each second amplifying device and the control electrode of the first amplifying device in the next succeeding stage of the chain,
a separate capacitor means connected between each different direct current conducting means and the first electrode of the first amplifying device associated therewith,
means for applying energizing signals, during selected time periods, between the output and first electrodes of both the first and second amplifying devices of alternate ones of the stages in said chain, and
means for applying energizing signals, during other time periods, between the first and output electrodes of the first and second amplifying devices in the remaining ones of said stages.

2. The combination comprising:
a chain of cascaded stages, each stage including a first amplifying device and a second amplifying device,
each said amplifying device having a first electrode and an output electrode defining a current carrying path, and having a control electrode,
means intercoupling the output electrode of each first amplifying device and the control electrode of the second amplifying device in the same stage,
direct current conducting means intercoupling the output electrode of each second amplifying device and the control electrode of the first amplifying device in the next succeeding stage of the chain,
a separate capacitor means connected between each different direct current conducting means and the first electrode of the first amplifying device associated therewith,
separate output means connected to the output electrode of each second amplifying device,
means for applying energizing signals, during selected time periods, across the output and first electrodes of both the first and second amplifying devices of alternate ones of the stages in said chain, and
means for applying energizing signals, during other time periods, across the first and output electrodes of the first and second amplifying devices in the remaining ones of said stages.

3. The combination comprising:
a chain of cascaded stages, each stage including first and second insulated-gate field-effect devices,
each of said devices having source and drain electrodes and an insulated gate electrode,
means connecting the drain electrode of each first device to the gate electrode of the second device in the same stage,
a direct current connection between the drain electrode of each second device and the gate electrode of the first device in the next succeeding stage of the chain,
a separate capacitor connected between each different direct current connection and the source electrode of the first device associated therewith,
means for applying energizing signals, during selected time periods, across the source and drain electrodes of the first and second devices of the odd numbered stages in said chain, and
means for applying energizing signals, during other time periods, across the source and drain electrodes of the first and second devices in the even numbered ones of said stages.

4. The combination comprising:
a chain of cascaded stages each including first and second insulated-gate field-effect devices each having source, drain and insulated gate electrodes,
first negligible impedance means connecting the drain electrode of each first device to the gate electrode of the second device in the same stage,
second negligible impedance means connecting the drain electrode of the second device in each stage to the gate electrode of the first device in the next succeeding stage of the chain,
a separate capacitor connected between each different second negligible impedance means and the source electrode of the first device associated therewith,
means for selectively energizing the source and drain electrodes in the odd numbered ones of said stages, and
means for selectively energizing the source and drain electrodes of the even numbered stages out of phase with the energization of the source and drain electrodes in the odd numbered stages.

5. The combination comprising:
a chain of cascaded stages, each stage including a first amplifying device and a second amplifying device,
each said amplifying device having a first electrode and an output electrode defining a conduction path, and having a control electrode,
first negligible impedance means connected between the output electrode of each first amplifying device and the control electrode of the second amplifying device of the same stage,
second negligible impedance means connecting the output electrode of each second amplifying device in a stage to the control electrode of the first amplifying device in the next succeeding stage,
a separate capacitor connected between each different second negligible impedance means and the first electrode of the first amplifying device associated therewith,
resistance means connecting the output electrodes of all first amplifying devices in odd numbered ones of said stages to a first terminal,
a separate resistor and series connected unidirectional conducting device connected between the output electrode of the second amplifying device in each odd numbered stage and said first terminal,
resistance means connected between the output electrode of each first amplifying device in the even numbered stages and a second terminal,
a separate resistor and series connected unidirectional conducting device connected between said second terminal and the output electrode of each second amplifying device in the even numbered stages,
a third terminal common to the first electrode of all of the first and second amplifying devices,
means for applying energizing signals of a first phase between the first and third terminals, and
means for applying energizing signals of a second, different phase between the second and third terminals.

6. The combination comprising:
a chain of cascaded stages, each stage including first and second insulated-gate field-effect transistors,
each of said transistors having a source electrode and a drain electrode defining a conduction path, and having an insulated gate electrode,
first negligible impedance means connected between the drain electrode of each first transistor and the gate of second transistor in the same stage,
second negligible impedance means connecting the drain electrode of each second transistor in a stage to the gate electrode of the first transistor in the next succeeding stage,
a separate capacitor connected between each different second negligible impedance means and the source electrode of the first transistor associated therewith,
resistance means connecting the drain electrodes of all first transistors in odd numbered ones of said stages to a first terminal, a separate resistor and series unidirectional conducting device connected between the drain electrode of the second transistor in each odd numbered stage and said first terminal, resistance means connected between the drain electrode of each first transistor in the even numbered stages and a second terminal, a separate resistor and series connected unidirectional conducting device connected between said second terminal and the drain electrode of each second transistor in the even numbered stages, a third terminal common to the source electrode of each of the first and second transistors, means for applying energizing signals of a first phase between the first and third terminals, and means for applying energizing signals of a second, different phase between the second and third terminals.

7. The combination comprising:

a chain of cascaded stages, each stage including a first and second insulated-gate field-effect transistor, each of said transistors having a source electrode, a drain electrode and an insulated gate electrode, first negligible impedance means connecting the drain electrode of each first transistor to the gate electrode of the second transistor in the same stage, second negligible impedance means connecting the drain electrode of each second transistor in a stage to the gate electrode of the first transistor in the next succeeding stage, a separate capacitor connected between each different second negligible impedance means and the source electrode of the first transistor associated therewith, resistance means connecting the drain electrodes of all first transistors in odd numbered ones of said stages to a first terminal, a separate resistor and series unidirectional conducting device connected between the drain electrode of the second transistor in each odd numbered stage and said first terminal, resistance means connected between the output drain electrode of each first transistor in the even numbered stages and a second terminal, a separate resistor and series connected unidirectional conducting device connected between said second terminal and the drain electrode of each second transistor in the even numbered stages, a third terminal common to the source electrode of each of the first and second transistors, means for periodically applying energizing signals of a first phase between the first and third terminals, and means for periodically energizing signals of a second, opposite phase between the second and third terminals.

8. The combination comprising:

a chain of cascaded stages, each stage having first and second insulated-gate field-effect devices, each field-effect device having source, drain and insulated gate electrodes, first negligible impedance means connecting the drain electrode of each first device to the gate electrode of the second device in the same stage, second negligible impedance means connecting the drain electrode of each second device to the gate electrode of the first device in the next succeeding stage of said chain, means connecting all of the source electrodes in common to a first terminal, a separate capacitor connected between each different first negligible impedance means and said first terminal, a separate capacitor connected between each different second negligible impedance means and said first terminal, a second terminal and a third terminal, a separate resistor and unidirectional conducting device serially connected between said second terminal and each drain electrode of the first and second devices in the odd numbered stages, a separate resistor and series connected unidirectional conducting device connected between said third terminal and each drain electrode of the first and second devices in the even numbered stages, means for applying energizing signals of a first phase and frequency between the first and second terminals, and means for applying energizing signals of the said same frequency, but of different phase, between the first and third terminals.

9. The combination comprising:

a chain of cascaded stages, each stage having first and second insulated-gate field-effect devices, each field effect device having source, drain and insulated gate electrodes, first negligible impedance means connecting the drain electrode of each first device to the gate electrode of the second device in the same stage, second negligible imperance means connecting the drain electrode of each second device to the gate electrode of the first device in the next succeeding stage of said chain, means connecting all of the source electrodes in common to a first terminal, a separate capacitor connected between each different first negligible impedance means and said first terminal, a separate capacitor connected betwen each different second negligible impedance means and said first terminal, a second terminal and a third terminal, a separate resistor and a unidirectional conducting device serially connected between said second terminal and each drain electrode of the first and second devices in the odd numbered stages, a separate resistor and series connected unidirectional conducting device connected between said third terminal and each drain electrode of the first and second devices in the even numbered stages, means for applying energizing signals of a first phase and frequency between the first and second terminals, and means for applying energizing signals of the said frequency, but of opposite phase, between the first and third terminals.

10. The combination comprising:

a chain of cascaded stages, each stage having first and second insulated-gate field-effect devices, each field effect device having source, drain and insulated gate electrodes, first negligible impedance means connecting the drain electrode of each first device to the gate electrode of the second device in the same stage, second negligible impedance means connecting the drain electrode of each second device to the gate electrode of the first device in the next succeeding stage of said chain, means connecting all of the source electrodes in common to a first terminal, a separate capacitor connected between each different first negligible impedance means and said first terminal, a separate capacitor connected between each different second negligible impedance means and said first terminal, a second terminal and a third termial, a separate resistor and unidirectional conducting device serially connected between said second terminal and each drain electrode of the first and second devices in the odd numbered stages, a separate resistor and series connected unidirectional conducting device connected between said third terminal and each drain electrode of the first and second devices in the even numbered stages, means for applying energizing signals of a first phase and frequency between the first and second terminals, means for applying energizing signals of the same said frequency, but of different phase, between the first and third terminals, and means for selectively applying an input signal between the gate and source electrodes of the first device in the first stage.

References Cited by the Examiner

UNITED STATES PATENTS

| | | | |
|---|---|---|---|
| 2,876,365 | 3/1959 | Slusser | 307—88.5 |
| 2,906,890 | 9/1959 | Odell et al. | 307—88.5 |
| 2,991,374 | 7/1961 | De Miranda | 307—88.5 |

ARTHUR GAUSS, *Primary Examiner.*

J. HEYMAN, *Assistant Examiner.*